United States Patent [19]

Kumazaki et al.

[11] Patent Number: 5,430,874
[45] Date of Patent: Jul. 4, 1995

[54] CONTROL METHOD AND SYSTEM FOR MANAGING MEMORY CONTROL BLOCKS OF PROGRAMMED TASKS IN A MULTI-PROCESSING SYSTEM

[75] Inventors: Hiroyuki Kumazaki; Kazuhiro Sato, both of Yokohama; Tetsuhiko Fujii, Kawasaki, all of Japan

[73] Assignee: Hitachi, Limited, Tokyo, Japan

[21] Appl. No.: 25,974

[22] Filed: Mar. 3, 1993

[30] Foreign Application Priority Data

Mar. 6, 1992 [JP] Japan .................................. 4-049327

[51] Int. Cl.6 ................................................ G06F 9/40
[52] U.S. Cl. .............................. 395/650; 364/DIG. 1; 364/230; 364/230.1; 364/230.3; 364/281.3; 364/281.8
[58] Field of Search ................. 395/650; 364/DIG. 1, 364/230, 230.1, 230.3, 281.3, 281.8

[56] References Cited

U.S. PATENT DOCUMENTS 5,012,409 4/1991 Fletcher et al. ..................... 364/200
5,247,675 9/1993 Farrell et al. ........................ 395/650
5,247,677 9/1993 Welland et al. ..................... 395/650

*Primary Examiner*—Kevin A. Kriess
*Assistant Examiner*—A. Katbab
*Attorney, Agent, or Firm*—Gerald E. Lester; Gordon T. Arnold; Bruce W. Slaydon

[57] ABSTRACT

A method and system for reducing overhead time required to search for memory blocks having programmed executable tasks. The system includes a memory control block queue for managing all memory control blocks, and an executable task control block queue which is a subset of the memory control block queue and which is regularly updated to include memory control blocks having pointers to only programmed currently-executing tasks and programmed executable tasks. When a search for executable tasks is initialized, only the executable task control block queue need be searched. Unnecessary overhead time needed to search memory control blocks having only unexecutable tasks is eliminated.

4 Claims, 3 Drawing Sheets

CONTROL METHOD AND SYSTEM FOR MANAGING MEMORY CONTROL BLOCKS OF PROGRAMMED TASKS IN A MULTI-PROCESSING SYSTEM

BACKGROUND OF THE INVENTION

The present invention relates to a system of priority control of the execution of programmed tasks in a computer system, wherein the system is a part of the overall operating system. More particularly, this invention relates to a control system for decreasing the overhead time of preferential execution of tasks in a computer system using a queue for scheduling tasks, or a system using tightly coupled multiprocessors.

Priority control of execution of tasks has previously been accomplished by a system which made decisions on the order of execution of tasks by connecting all tasks to a queue and thereafter sequentially searching them one by one. However, this type of well known control system creates an additional problem in that the computer system performance is seriously degraded because of the large resulting overhead time needed for such a sequential queue search.

Japanese Laid-open Patent Application No. 281338/1990 discloses a control system which attempts to solve this problem by improving the system efficiency by checking the length of a task execution queue, and thereafter changing the execution sequence in accordance with the length of the queue. However, this type of control system is not necessarily suitable for priority task execution control, although the search efficiency is improved, because the tasks having the longest queues are executed regardless of the task execution priority. This is because tasks associated with long queues are executed first, regardless of actual task priority when compared to other tasks in the system.

Japanese Laid-open Patent Application No. 24629/1991 discloses another task control system for accelerating task search while attempting to decrease the time overhead required for the addition or deletion of memory associated with "task control blocks." This method of control is accomplished by forming a "task control block" into a double queue consisting of an "arrival-order queue" and a "queue following the execution" priority. However, in that invention consideration of the time required for deleting tasks from a queue is not taken into account. Therefore, to apply such a system to the control of priority task execution, in which a plurality of tasks are present, the frequency of additions or deletions resulting from the double queue increases; and performances are again degraded.

Additionally, some existing computer systems have a problem in that the time for searching a memory space having an executable task is considerably longer than the time required to actually execute the task. Therefore, system performances are again degraded because the number of "memory" spaces increases depending on the scale of the computer system. Also, in computer systems having tightly-coupled multiprocessors, a problem is presented in that the multiprocessor "use efficiency" is decreased. The resulting system performance is not improved proportionally to the number of processors even if a plurality of processors are used. In such cases, the search time is long because the entire system performance is degraded as other processors (which cannot simultaneously execute searches while one processor searches the memory space queue) sit idle until the search is complete.

SUMMARY OF THE INVENTION

The present invention solves these problems and provides a means for greatly decreasing the time for searching a memory space queue having at least one executable task or currently executing task.

The object of the present invention is achieved by reorganizing the total memory space control block queue, and then selectively queuing only the memory spaces (designated by executable control blocks) in which tasks which are ready for execution are present.

The present invention decreases the time overhead required for searching an executable memory space by creating and using these "control block" queues. The present invention also provides a function for delaying the time required to delete a space from a queue until after all executable tasks or currently-executing tasks have disappeared from the queue. This makes it further possible to decrease the time, "overhead" required for deleting the spaces from a queue as another task becomes ready for execution. As a result, this control block queue system improves the performance of a large-scale system having large amounts of memory as well as such systems using tightly-coupled multiprocessor(s).

DETAILED DESCRIPTION OF THE PREFERRED EMBODIMENTS

Figure 1:
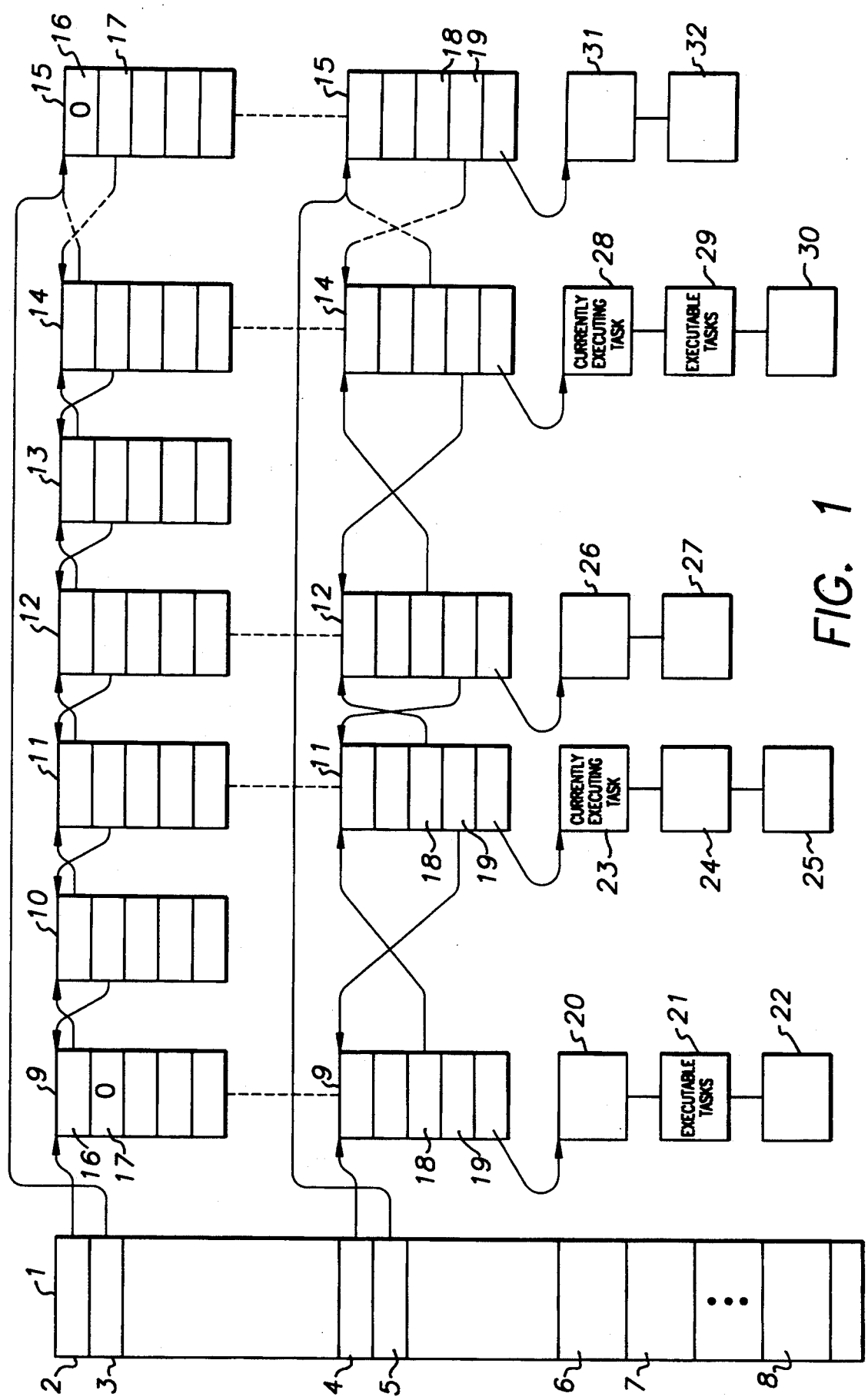
FIG. 1 is a diagram showing the structure of an embodiment of the present invention.

An embodiment of the present invention is described below by referring to the drawings.

FIG. 1 illustrates an embodiment of the present invention having two memory control block queues. The first queue, referred to as the composite memory control block queue, is a queue of all memory control blocks comprising a memory system. The second queue, referred to as the executable task control block queue, is a subset of the first queue and is limited to those memory control blocks having only executable and currently executing tasks. In FIG. 1, numeral 1 is an operating system, 9 to 15 are memory control blocks, 2 is a head pointer containing the physical address of the initial queue for the first memory control block of queues for all memory control blocks, 3 is a tail pointer containing the physical address of the end of the queue for the memory control block of queues for all memory control blocks, 4 is a head pointer containing the physical address of the start of the queue for the executable-task control block queue, and 5 is a tail pointer containing the physical address of the end of the queue for the executable-task control block. In this case, the control blocks 9, 11, 12, 14, and 15 are shown twice so that the queue structure can be easily understood. Each control block includes bidirectional pointers 16 and 17 for the composite memory control block queue; and bidirectional pointers 18 and 19 for the executable-task control block queue.

Each control block may represent tasks such as 20 to 32. The executable-task control block queue is composed of a combination, or representation, of four types of control blocks. Referring to FIG. 1, these blocks may be, for example: (i) blocks such as 9 and 15 representing one or more executable tasks; (ii) block 11 representing one currently-executing task; (iii) block 14 representing one currently-executing task and other executable tasks; or (iv) block 12 representing neither currently-executing nor executable task. Moreover, the operating system 1 has the pointers 6 to 8 to indicate the block in which search is next to be diverted in the executable-task control block queue for each separate processor.

The operation of the above embodiment is described below by referring to FIGS. 2, 3, and 4.

Figure 2:
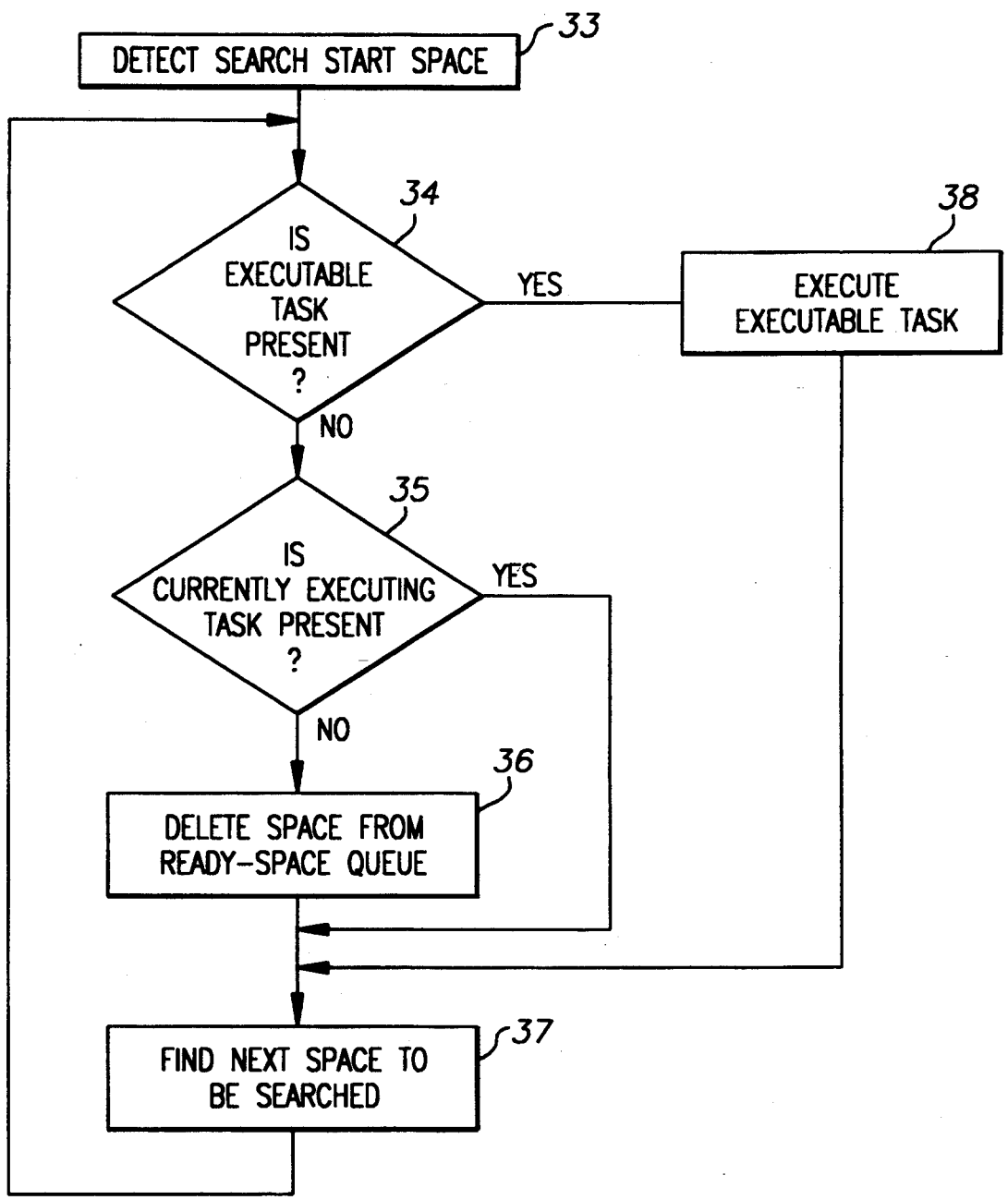
FIG. 2 is a flow chart outlining the logic of search of a ready-space queue.

FIG. 2 is a flow chart depicting the logic of searching a executable-task control block queue according to the present invention. The operating system 1 selects a memory space, represented by a memory control block, in which the system starts to search, through the use of pointers 6 to 8 (as indicated in Step 33). The system then searches the states of tasks (which may be executable or currently-executing) in the control blocks (as indicated in Steps 34 and 35). When searching the blocks 9 or 14, the system 1 executes, or performs, the executable tasks 21 and 29 (as shown in Step 38) when such tasks are "present", or represented in the control block. When searching the block 11, the system 1 looks to the next block in sequence (indicated in Step 37), and searches, without deleting, the block 11, because a currently-executing task 23 is present.

Next, control block 12 is searched, but will remain in the queue even though no executable task is present. This is because the time for deleting the block 12 is delayed until the executable, or currently-executing, task disappears from the queue. Alternatively, the time for deleting such a control block (as for instance control block 12) is delayed for a specific, or preset, time past the time the operating system 1 determines that no other executable or currently-executing task is present in the queue.

In an alternative embodiment when searching control block 12, the system will delete the block 12 from the executable-task control block queue (as shown in Step 36) because no executable or currently-executing task is present in the block. The system 1 will then start searching the next block. In this case, the block 12 is deleted from the executable-task control block queue because the operating system 1 first determines that no executable or currently-executing task is present or represented in the block.

Therefore, it is possible to use a control system, as part of the operating system, according to the present invention to immediately delete a control block, or to delay the time for deleting the block from the executable-task control block queue until the system executes the "n-th decision", or until a preset time has expired. A system according to the present invention, therefore, may measure the elapsed time from when executable, or currently-executing, tasks disappears from the queue, and thereafter delete the block when the time exceeds the set value. Alternatively, in a system according to the present invention, the operating system 1 may search the executable-task control block queue at predetermined times to simultaneously delete blocks having no executable or currently-executing tasks associated with them.

Figure 3:
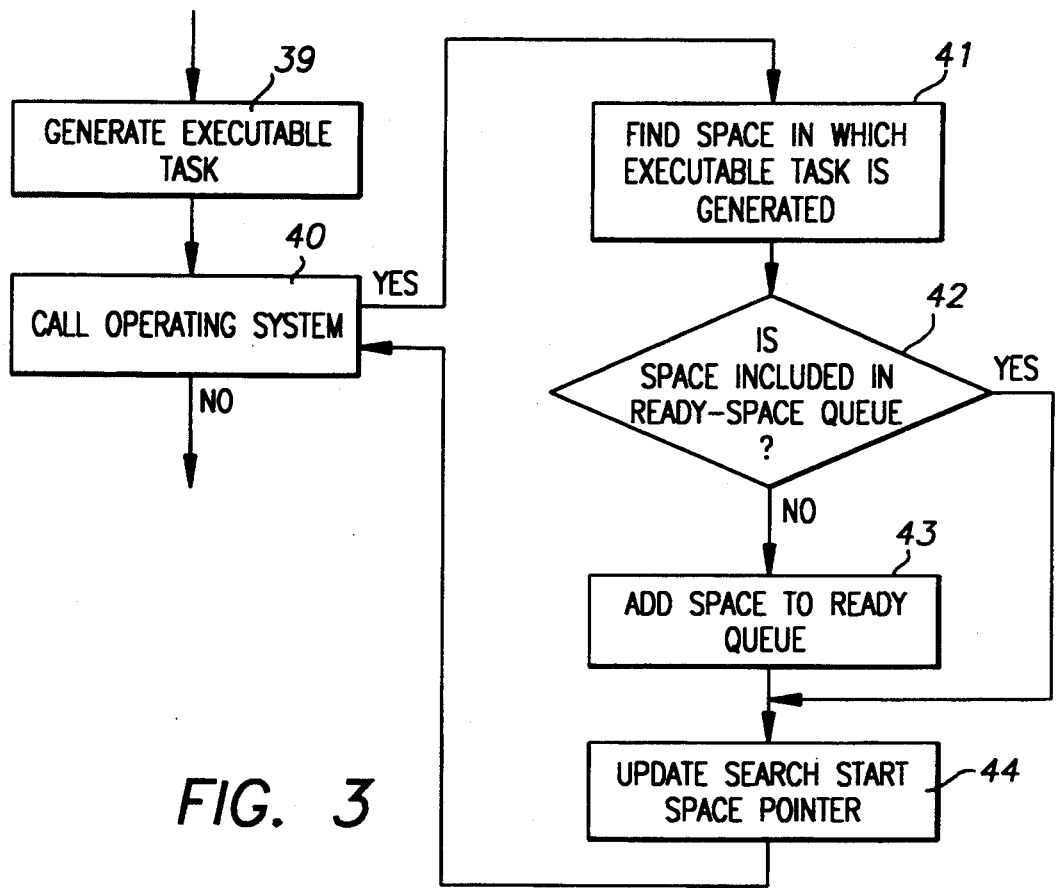
FIG. 3 is a flow chart outlining the logic of processing an executable task generated in a memory space.

FIG. 3 shows the processing logic which is executed when an executable task is generated in a memory space represented by a control block. When a nonexecutable task, as represented by the block 10 or 13, which are not a part of the executable-task control block queue, is made executable by a currently-executing task 23 or 28 (as shown in Step 39), the currently-executing task 23 or 28 calls the operating system 1 (indicated in Step 40). The operating system 1 detects the block in which an executable task was generated, as in Step 40; and thereafter checks to determine if the space is already present in the executable-task control block queue. If it is not, the system 1 performs an additional processing step (shown in Step 43). Thereafter, the system 1 detects the block to be searched next by means of the pointers 6 to 8; and compares the execution priority of the control block with that of a block in which an executable task has been newly generated. When the latter block has higher priority, the system performs the process of updating the search "start" pointer. That is, the system transfers the pointers (6 to 8) of the block to be searched next to the space having the higher priority (Step 44). As a result, the next control block search is always begun with a block having an executable task. Therefore, unnecessary control block searching is eliminated.

Figure 4:
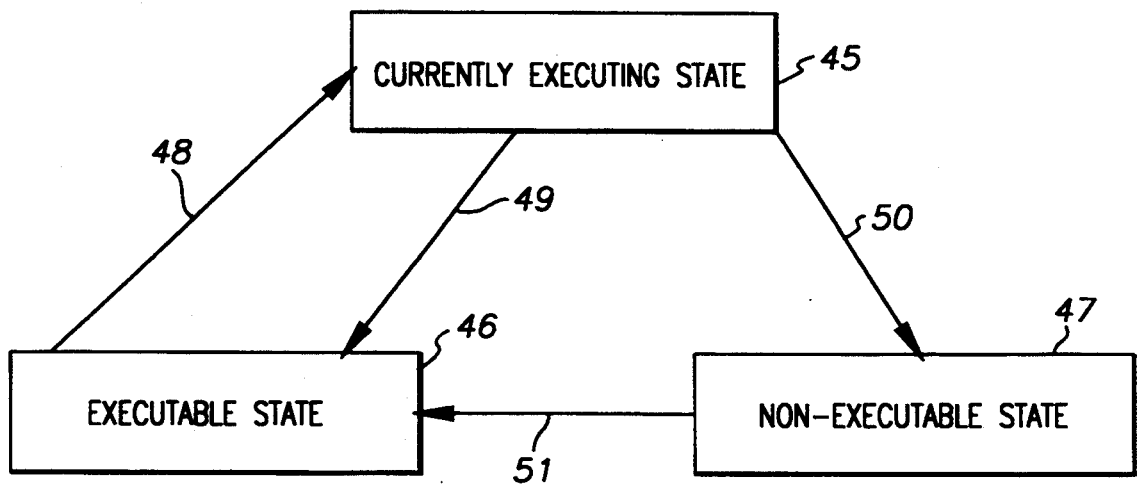
FIG. 4 is a diagram showing the task transition state.

FIG. 4 shows task state transitions. The task state shows the following four types of transitions: the transition 48 from the executable state 46 to the currently-executing state 45; the transition 49 from the currently-executing state 45 to the executable state 46; the transition 50 from the currently-executing state 45 to the nonexecutable state 47; and, the transition 51 from the nonexecutable state 47 to the executable state 46. When the task 26 in the control block 12 transfers from nonexecutable state to executable state immediately before search of the control block 12, but after search of the control block 11, the control block 12 is not deleted by the search shown in Step 34. As a result, no additional processing is executed within the executable-task control block queue as the result of decision in Step 42 although a new executable task is generated in the control block 12. When the executable task 21 in the space 9 transfers from currently-executing state to the executable state through the nonexecutable state, before the operating system searches the control block 9, (that is, when the task 21 goes through the transitions 50 and 51 or when it goes through the transition 49), the control block is searched in Step 34 and the task 21 is again executed. Thus, unnecessary control block searching is eliminated by organizing only control blocks having executable tasks into one queue. Moreover, when a control block having no executable task remains in the executable-task control block queue for a certain time, the frequency of control block addition to, or deletion from, the queue due to task state transition can be decreased.

The present invention makes it possible to search a memory space containing tasks to be executed, at a high speed, and, to also decrease the frequency of the number of times when tasks are added to, or deleted from, the queue. Thus, the efficiency of priority execution control of large-scale computer systems and the performance of the systems are improved.

What is claimed is:

1. A task control system for managing the execution priority of programmed tasks in a computer system having at least one CPU in electrical communication with an operating system and a memory system, said memory system having stored therein at least one of plural programmed executable tasks, plural programmed executing tasks, and plural programmed non-executable tasks, which comprises:

- first means in electrical communication with said at least one CPU for dividing said memory system into a plurality of memory control blocks, with each of said plurality of memory control blocks having stored therein a pair of bidirectional memory control block address pointers for directing the operation of said at least one CPU to adjacent ones of said plurality of memory control blocks, thereby forming a memory control block queue;
- second means in electrical communication with said at last one CPU for forming from said plurality of memory control blocks an executable task control block queue having plural queue members, with each of said plural queue members being comprised of one of said plurality of memory control blocks having at least one of said plural programmed executable tasks and said plural programmed executing tasks, and each of said plural queue members having a pair of bidirectional executable task control block address pointers for directing operation of said at least one CPU to adjacent ones of said plural queue members;
- third means in electrical communication with said at least one CPU for storing in said operating system a first pair of unidirectional address pointers and a second pair of unidirectional address pointers for respectively identifying to said at least one CPU a first of said plurality of memory control blocks in said memory control block queue and a last of said plurality of memory control blocks in said memory control block queue, and identifying to said at least one CPU a first of said plural queue members in said executable task control block queue and a last of said plural queue members in said executable task control block queue;
- fourth means in electrical communication with said at least one CPU for storing in said operating system a plurality of unidirectional address pointers in one to one CPU correspondence for pointing the operation of said at least one CPU to a highest priority one of said plural queue members having at least one of said plural programmed executable tasks; and
- fifth means in electrical communication with said at least one CPU for deleting from said executable task control block queue those of said plural queue members having only at least one of said programmed non-executable tasks, for adding to said executable task control block queue those of said plurality of memory control blocks having at least one of said programmed executable tasks and said programmed executing tasks, and for dynamically changing said pair of bidirectional executable task control block address pointers of each of said plural queue members, said second pair of unidirectional address pointers, and said plurality of unidirectional address pointers to transfer operation of said at least one CPU to said highest priority one of said plural queue members identified by said plurality of unidirectional address pointers, and to execute those of said plural programmed executable tasks that are stored in said highest priority one of said plural queue members.

2. A task control method for prioritizing the execution of programmed tasks in a data processing system having at least one CPU in electrical communication with an operating system and a memory system, which comprises the steps of:

(a) under control of said operating system, dividing said memory system into a plurality of memory control blocks, with each of said plurality of memory control blocks having stored therein a pair of bidirectional memory control block address pointers for directing the operation of said at least one CPU to adjacent ones of said plurality of memory control blocks, thereby forming a memory control block queue;

(b) storing a first pair of unidirectional address pointers in said operating system for directing the operation of said at least one CPU respectively to a first of said plurality of memory control blocks in said memory control block queue and to a last of said plurality of memory control blocks in said memory control block queue;

(c) forming from said plurality of memory control blocks under control of said operating system an executable task control block queue of plural queue members, with each of said plural queue members being comprised of one of said plurality of memory control blocks having at least one of plural programmed executable tasks and plural programmed executing tasks, and each of said plural queue members having a pair of bidirectional executable task control block address pointers for directing the operation of said at least one CPU to adjacent ones of said plural queue members;

(d) storing under control of said operating system a second pair of unidirectional address pointers in said operating system for respectively identifying to said at least one CPU a first of said plural queue members in said executable task control block queue and a last of said plural queue members in said executable task control block queue;

(e) storing under control of said operating system a plurality of unidirectional address pointers in said operating system in one to one CPU correspondence for pointing the operation of said at least one CPU to a highest priority one of said plural queue members having at least one of said plural programmed executable tasks;

(f) if one of said plural programmed executing tasks is not being performed in said highest priority one of said plural queue members, transferring the operation of said at least one CPU to said highest priority one of said plural queue members identified by said plurality of unidirectional address pointers, to execute those of said plural programmed executable tasks stored in said highest priority one of said plural queue members;

(g) transferring the operation of said at least one CPU to a next highest priority one of said plural queue members upon the occurrence of the following conditions during a search of said highest priority one of said plural queue members:
  (1) said next highest priority one of said plural queue members has only at least one of said plural programmed non-executable tasks and said plural programmed executable tasks, and
  (2) said highest priority one of said plural queue members has only at least one of said plural programmed non-executable tasks;

(h) directing said at least one CPU to execute those of said plural programmed executable tasks stored in said next highest priority one of said plural queue members if one of said plural programmed executing tasks is not present in said next highest priority one of said plural queue members; and (i) dynamically updating said executable task control block queue by adding those of said plurality of memory control blocks in which at least one of said plural programmed non-executable tasks is changed to one of said plural programmed executable tasks by the execution of at least one of said plural programmed executing tasks, and by deleting from said executable task control block queue those of said plural queue members having only at least one of said plural programmed non-executable tasks; and (j) repeating steps (c), (d), (e), (f), (g), (h), and (i) until all of said plural executable tasks in said memory system have been executed.

3. The method set forth in claim 2 above, further comprising the step of delaying deletion of those of said plural queue members having only at least one of said plural programmed non-executable tasks, from said executable task control block queue, until after expiration of a predetermined period of time following first access of said executable task control block queue.

4. The method set forth in claim 2 above, further comprising the step of delaying deletion of those of said plural queue members having only at least one of said plural programmed non-executable tasks, from said executable task control block queue, until all of said plural programmed executable tasks in said executable task control block queue have been performed.

* * * * *